(12) United States Patent
Li et al.

(10) Patent No.: US 8,082,582 B2
(45) Date of Patent: Dec. 20, 2011

(54) AUTHORIZATION SYSTEM OF NAVIGATION DEVICE AND ASSOCIATED AUTHORIZATION METHOD

(75) Inventors: Shr-Cheng Li, Taipei (TW); Hsien-Chang Liu, Nantou County (TW); Yun-Chang Chang, Hsinchu (TW); An-Bang Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 642 days.

(21) Appl. No.: 12/124,157

(22) Filed: May 21, 2008

(65) Prior Publication Data

US 2009/0293115 A1 Nov. 26, 2009

(51) Int. Cl.
G06F 7/04 (2006.01)
G06F 12/00 (2006.01)
G06F 12/14 (2006.01)
G06F 13/00 (2006.01)
G06F 17/30 (2006.01)
G11C 7/00 (2006.01)

(52) U.S. Cl. .......... 726/17; 713/171; 713/193; 380/200; 380/201; 380/231

(58) Field of Classification Search ...................... 726/17
See application file for complete search history.

(56) References Cited

U.S. PATENT DOCUMENTS

| | | | | |
|---|---|---|---|---|
| 5,036,461 A * | 7/1991 | Elliott et al. | ..................... | 705/44 |
| 6,028,937 A * | 2/2000 | Tatebayashi et al. | ......... | 713/169 |
| 6,507,907 B1 * | 1/2003 | Takahashi et al. | ............ | 713/150 |
| 6,516,414 B1 * | 2/2003 | Zhang et al. | ................... | 713/176 |
| 6,538,560 B1 * | 3/2003 | Stobbe et al. | ................. | 340/5.72 |
| 6,550,008 B1 * | 4/2003 | Zhang et al. | ................... | 713/155 |
| 7,185,362 B2 * | 2/2007 | Hawkes et al. | ..................... | 726/4 |
| 7,231,657 B2 * | 6/2007 | Honarvar et al. | .................. | 726/2 |
| 7,395,435 B2 * | 7/2008 | Benhammou et al. | ........ | 713/185 |
| 7,706,470 B2 * | 4/2010 | Chuang et al. | ................ | 375/316 |
| 7,725,927 B2 * | 5/2010 | Yang et al. | ......................... | 726/5 |
| 7,739,402 B2 * | 6/2010 | Roese et al. | .................. | 709/242 |
| 7,757,274 B2 * | 7/2010 | Lillie et al. | ......................... | 726/4 |
| 2003/0225893 A1 * | 12/2003 | Roese et al. | .................. | 709/227 |
| 2005/0216577 A1 * | 9/2005 | Durham et al. | ................ | 709/223 |
| 2006/0179128 A1 * | 8/2006 | Haulin et al. | .................. | 709/220 |
| 2007/0087756 A1 * | 4/2007 | Hoffberg | ....................... | 455/450 |
| 2007/0168663 A1 * | 7/2007 | Hirai et al. | ..................... | 713/169 |
| 2007/0174467 A1 * | 7/2007 | Ballou et al. | ................... | 709/227 |
| 2007/0220616 A1 * | 9/2007 | Oh | ................................... | 726/30 |
| 2007/0265981 A1 * | 11/2007 | Kim et al. | ........................ | 705/59 |
| 2008/0154251 A1 * | 6/2008 | Stuart et al. | ..................... | 606/13 |
| 2008/0235403 A1 * | 9/2008 | Krantz et al. | .................. | 709/249 |
| 2008/0235763 A1 * | 9/2008 | Krantz et al. | ...................... | 726/2 |
| 2008/0289033 A1 * | 11/2008 | Hamilton et al. | ............... | 726/19 |
| 2009/0013190 A1 * | 1/2009 | Benhammou et al. | ........ | 713/185 |
| 2009/0185543 A1 * | 7/2009 | Chen et al. | .................... | 370/338 |

* cited by examiner

*Primary Examiner* — Taghi Arani
*Assistant Examiner* — Mahfuzur Rahman
(74) *Attorney, Agent, or Firm* — Winston Hsu; Scott Margo

(57) ABSTRACT

An authorization system of a navigation device includes a first identification (ID) module and a second ID module. The first ID module is arranged to perform authorization for a first portion of the navigation device, and the second ID module is arranged to perform authorization for a second portion of the navigation device. The first and the second ID modules perform bidirectional authorization of the first and the second portions, and further determine behavior of the navigation device according to a result of the bidirectional authorization. An associated authorization method for controlling the navigation device is further provided.

14 Claims, 4 Drawing Sheets

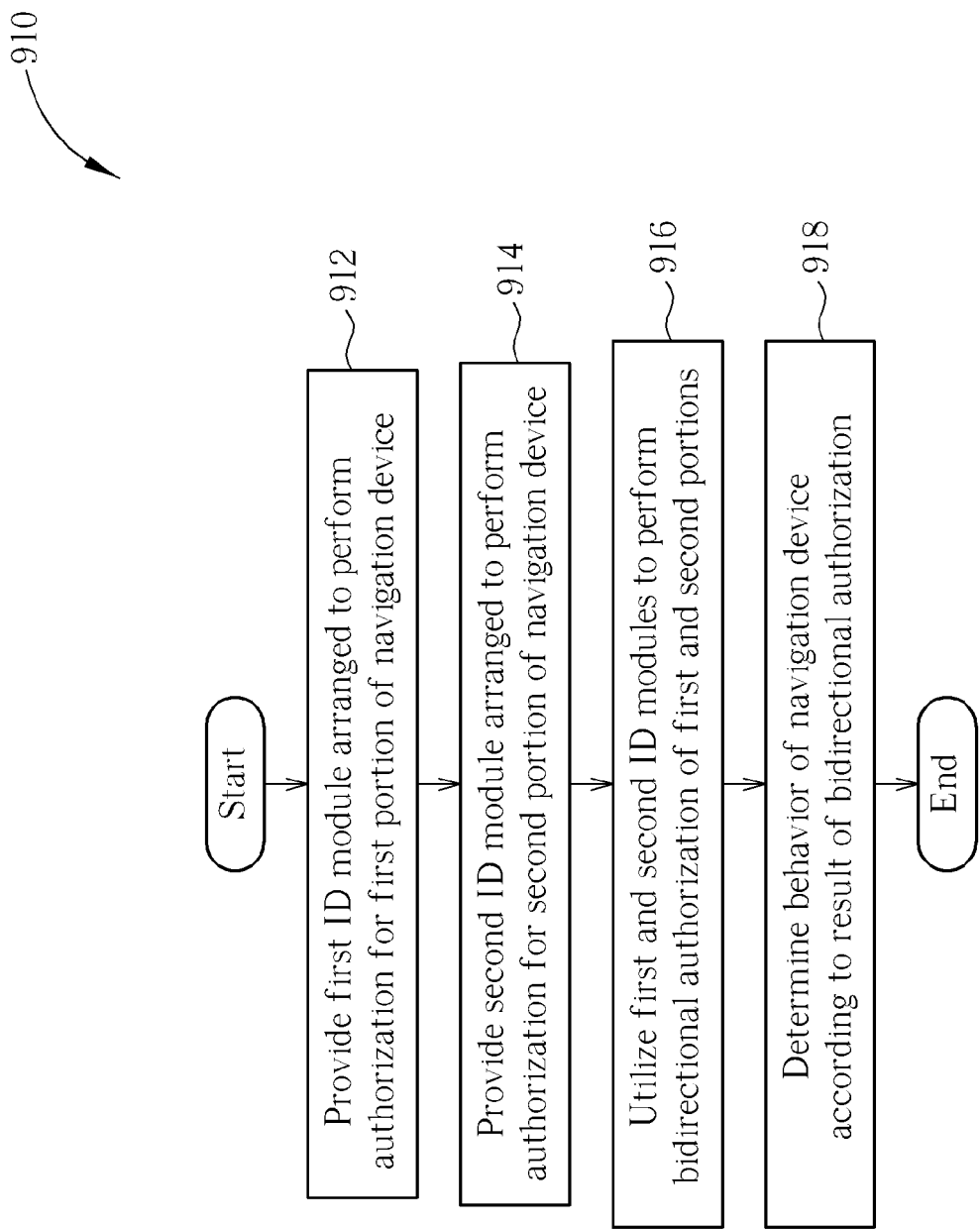

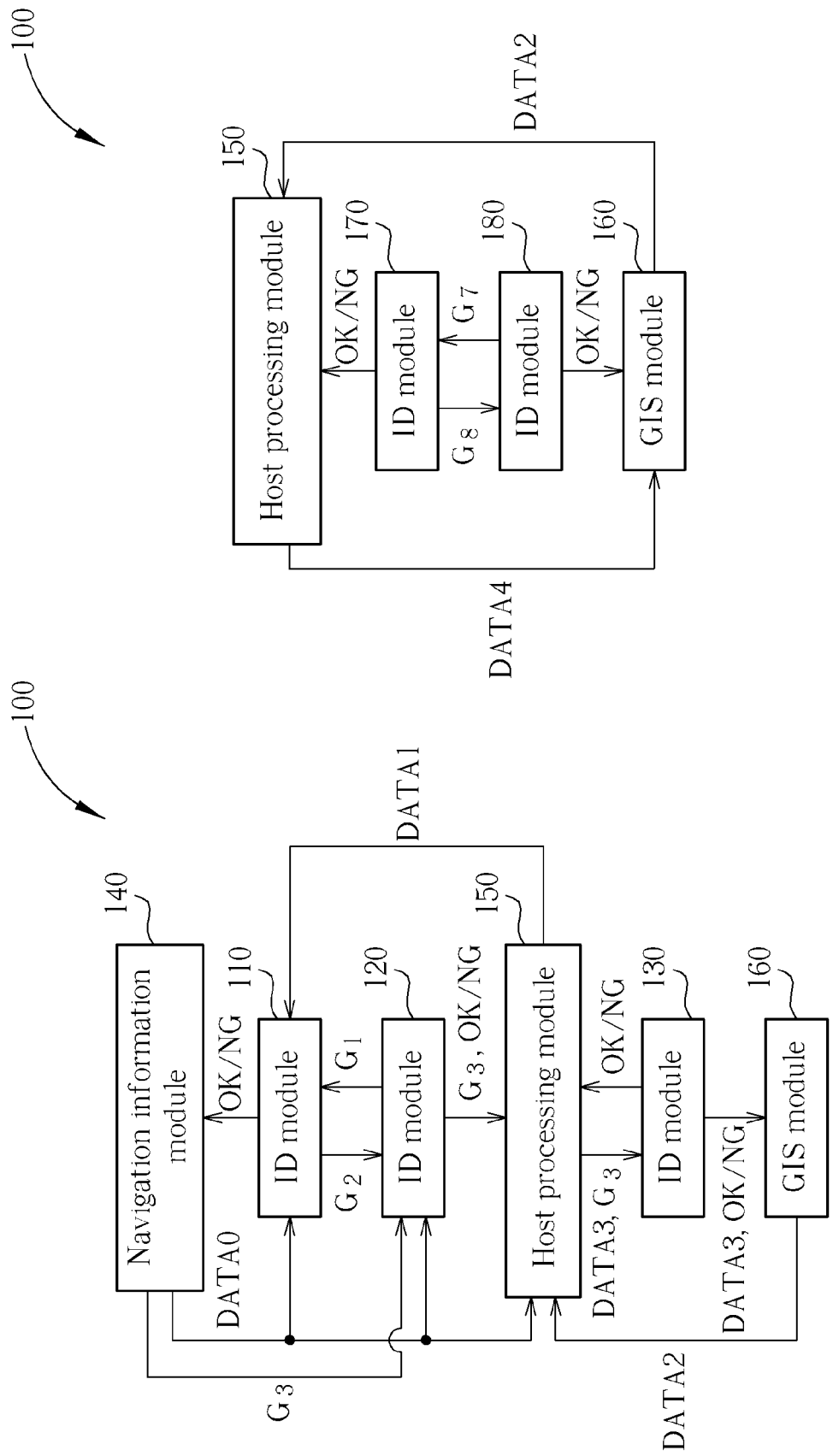

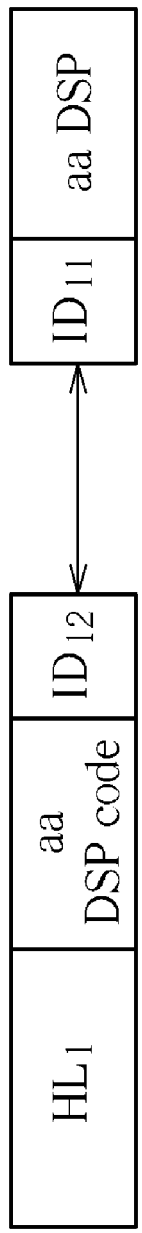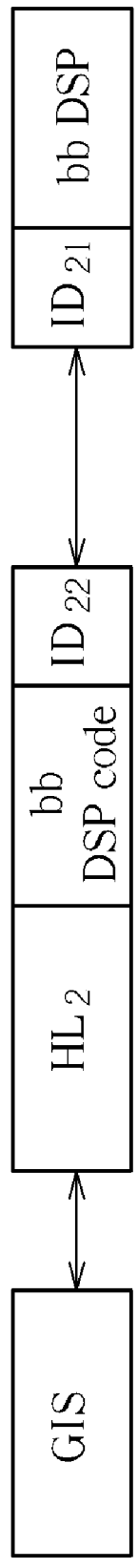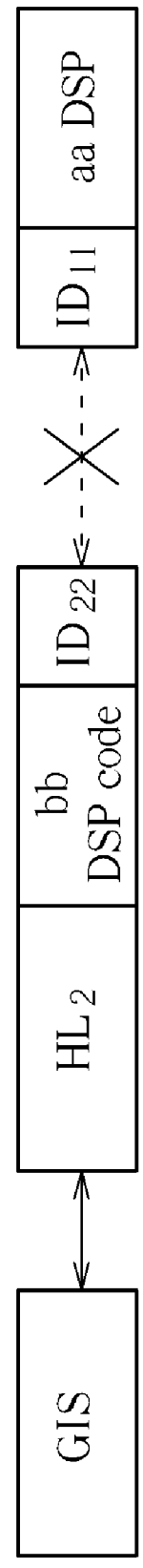
FIG. 5

AUTHORIZATION SYSTEM OF NAVIGATION DEVICE AND ASSOCIATED AUTHORIZATION METHOD

BACKGROUND

The present invention relates to module authorization method and system of a navigation device.

Navigation integrated circuit (IC) providers may develop different models of Navigation ICs that are sold at different respective prices. For example, a low-end model Navigation IC without a Geographic Information System (GIS) module is sold at a lower price, while a high-end model Navigation IC with a GIS module is sold at a higher price.

Please refer to FIG. 1, which shows a situation where the GIS module is intentionally utilized with the low-end model Navigation IC. The block labeled "aa DSP" (which, in this example, is a digital signal processor (DSP) having a hardware code embedded therein) represents the low-end model Navigation IC and executes a high level program $HL_1$ implemented with a random access memory (RAM) code named "aa DSP code". The block labeled "bb DSP" (which, in this example, is also a DSP having a hardware code embedded therein) represents the high-end model Navigation IC and executes a high level program $HL_2$ implemented with a RAM code named "bb DSP code". By executing the high level program $HL_2$ implemented with the RAM code named "bb DSP code", the high-end model Navigation IC (i.e. the "bb DSP") is capable of utilizing the GIS module mentioned above.

As shown in the bottom-most graph of FIG. 1, a hacker intentionally replaces the RAM code "aa DSP code" with the RAM code "bb DSP code" (or an altered version thereof) to be executed by the low-end model Navigation IC (i.e. the "aa DSP"), in order to utilize the GIS module without paying any fee. Obviously, no Navigation IC provider would wish to see this situation since the higher price of the high-end model Navigation IC (i.e. the "bb DSP") reflects the cost of the GIS module.

If the hacker announces that he/she can replace the RAM code for navigation devices implemented with the low-end model Navigation IC, and such a plan is really carried out, the Navigation IC provider and the manufacturers of the navigation devices will suffer a great loss due to the hacker's illegal activities, and such activities could have far-reaching consequences in the research and development environment, such as decreasing technical innovations in industry.

SUMMARY

An exemplary embodiment of an authorization system of a navigation device comprises a first identification (ID) module and a second ID module. The first ID module is arranged to perform authorization for a first portion of the navigation device, and the second ID module is arranged to perform authorization for a second portion of the navigation device. In addition, the first and the second ID modules perform bidirectional authorization of the first and the second portions, and further determine behavior of the navigation device according to a result of the bidirectional authorization.

An exemplary embodiment of an authorization method for controlling a navigation device comprises: performing a first authorization for a first portion of the navigation device; performing a second authorization for a second portion of the navigation device; performing a bidirectional authorization of the first and the second portions; and determining behavior of the navigation device according to a result of the bidirectional authorization.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a flowchart of an authorization method for controlling a navigation device in order to perform bidirectional authorization according to one embodiment of the present invention.

FIG. 3 is a block diagram of a plurality of modules of the navigation device in the embodiment shown in FIG. 2.

FIG. 4 is a block diagram of a plurality of modules of the navigation device in the embodiment shown in FIG. 2.

FIG. 5 illustrates that an illegal activity such as that shown in FIG. 1 is forbidden when bidirectional authorization is performed by applying the authorization method shown in FIG. 2 according to one embodiment of the present invention.

DETAILED DESCRIPTION

Figure 1:
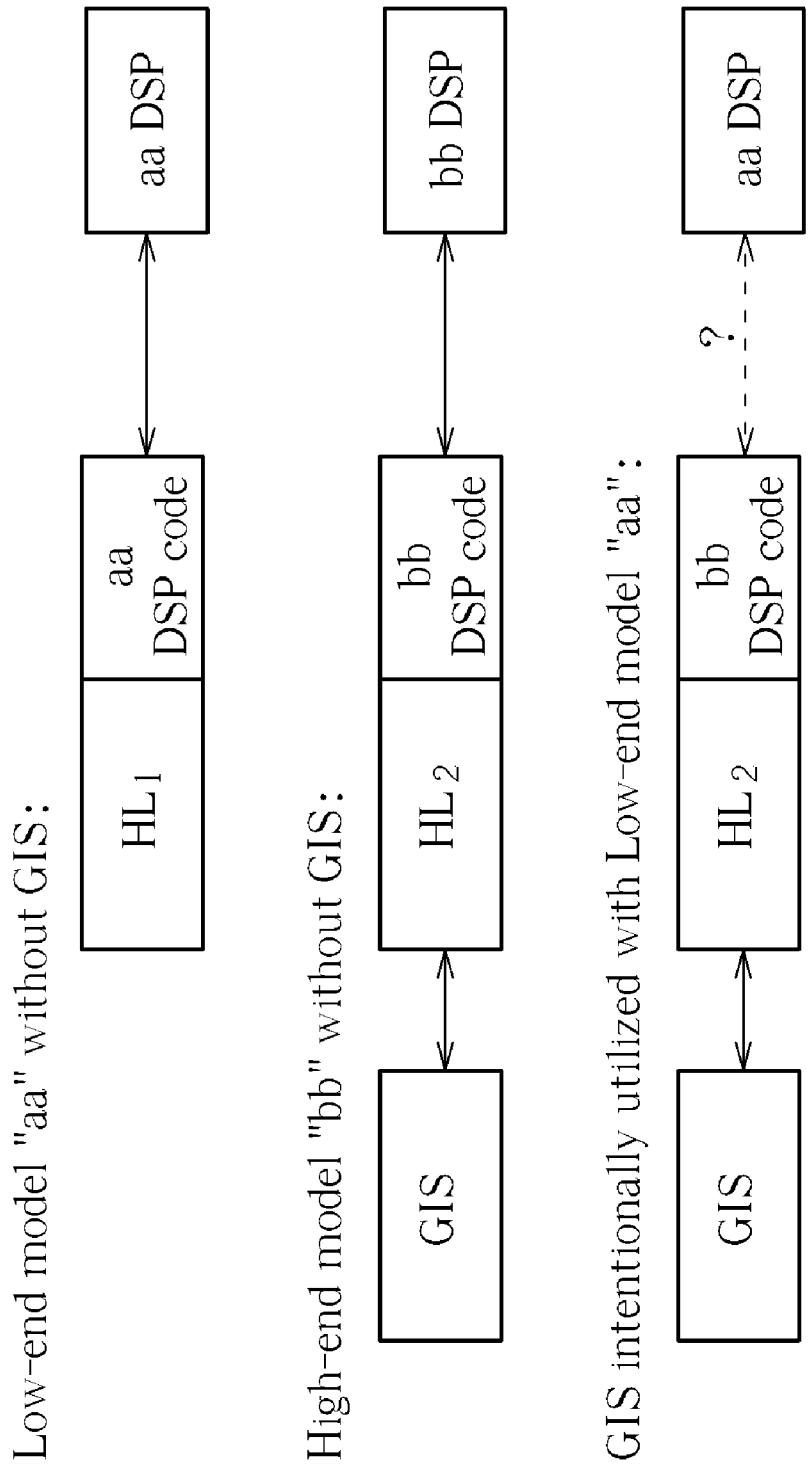
FIG. 1 illustrates a situation where a Geographic Information system (GIS) module is intentionally utilized with a low-end model navigation device integrated circuit (IC).

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Please refer to FIG. 2. FIG. 2 illustrates a flowchart of an authorization method 910 for controlling a navigation device in order to perform bidirectional authorization according to one embodiment of the present invention. The authorization method 910 can be widely applied to various kinds of products according to different embodiments of the present invention. For example, the navigation device can be a personal navigation device (PND), an automotive navigation device, a cellular phone with navigation functions, a personal digital assistant (PDA) with multiple functions comprising cellular phone functions and navigation functions, or a certain electronic device with navigation functions. The authorization method 910 is described as follows:

Step 912: Provide a first identification (ID) module arranged to perform authorization for a first portion of the navigation device.

Step 914: Provide a second ID module arranged to perform authorization for a second portion of the navigation device.

Step 916: Utilize the first and the second ID modules to perform bidirectional authorization of the first and the second portions.

Step 918: Determine behavior of the navigation device according to a result of the bidirectional authorization.

In general, the bidirectional authorization can be widely applied to any two various portions of the navigation device, where the two portions that are involved in the bidirectional authorization (e.g. the first and the second portions) may comprise at least one software module and/or at least one hardware circuit. For example, the first portion can be a software module and the second portion can be a hardware circuit. In another example, the first portion can be a hardware circuit and the second portion can be a software module. In another example, both the first and the second portions can be software modules. In another example, both the first and the second portions can be hardware circuits.

Similarly, the associated ID modules utilized for performing the bidirectional authorization may comprise at least one software module and/or at least one hardware circuit. For example, the first ID module can be a software module and the second ID module can be a hardware circuit. In another example, the first ID module can be a hardware circuit and the second ID module can be a software module. In another example, both the first and the second ID modules can be software modules. In another example, both the first and the second ID modules can be hardware circuits.

According to this embodiment, the first ID module generates challenge information to challenge the second ID module in order to determine whether the second portion is authorized, where the challenge information is generated by the first ID module according to a position $P_1$, a velocity $V_1$ and/or a time $T_1$ of the navigation device. For example, the challenge information is generated according to a data set ($P_1$, $V_1$, $T_1$), i.e. all the three parameters $P_1$, $V_1$ and $T_1$ mentioned above. The first ID module checks whether the second ID module generates a correct response to the challenge information in order to determine whether the second portion is authorized.

In practice, the challenge information can be generated with a function $F_1$ of the data set ($P_1$, $V_1$, $T_1$), i.e. $F_1(P_1, V_1, T_1)$. Thus, the challenge information will never appear with a fixed pattern. As the challenge information is variable information, it is very hard for a hacker to monitor the challenge information. As a result, only the second ID module, not the hacker, is capable of generating the correct response corresponding to the data set ($P_1$, $V_1$, $T_1$).

For example, when the first ID module generates the challenge information corresponding to the data set ($P_1$, $V_1$, $T_1$), the second ID module is capable of generating a correct response to the challenge information. The first ID module finds that the response from the second ID module is correct, and determines that the second portion is authorized. Then, as long as the second ID module further determines that the first portion is authorized, the result of the bidirectional authorization indicates that the first and the second portions pass the bidirectional authorization. As a result of Step 918, the navigation device should operate as usual.

When the second ID module is replaced with something else by the hacker, the first ID module may find that there is no such response to the challenge information, or may find that a received response is abnormal or incorrect. In response to this situation, the first ID module can simply halt the whole navigation device in Step 918.

Similarly, according to an implementation choice, the second ID module may also generate challenge information to challenge the first ID module in order to determine whether the first portion is authorized, where the challenge information generated by the second ID module may depend on a position $P_2$, a velocity $V_2$ and/or a time $T_2$ of the navigation device, such as a data set ($P_2$, $V_2$, $T_2$). Here, the challenge information can be generated with a function $F_2$ of the data set ($P_2$, $V_2$, $T_2$), i.e. $F_2(P_2, V_2, T_2)$. For similar reasons, only the first ID module, not the hacker, is capable of generating the correct response corresponding to the data set ($P_2$, $V_2$, $T_2$).

Therefore, when the hacker tries to crack the security architecture implemented with the bidirectional authorization of this invention, the probability of successfully guessing all the data sets ($P_1$, $V_1$, $T_1$) and ($P_2$, $V_2$, $T_2$) together with the functions $F_1$ and $F_2$ is very low. It should be noted that, depending on different implementation choices, the function $F_2$ can be the same as the function $F_1$ or different from the function $F_1$.

As mentioned, the second ID module may generate challenge information to challenge the first ID module in order to determine whether the first portion is authorized. This is only for illustrative purposes and is not meant to be a limitation of the present invention. According to another implementation choice, the second ID module checks whether the challenge information generated by the first ID module is correct in order to determine whether the first portion is authorized. That is, the second ID module determines whether the first portion is authorized by checking whether the challenge information generated by the first ID module is correct, instead of generating any challenge information and waiting for a response from the first ID module.

More particularly, according to whether the challenge information generated by the first ID module is correct, the second ID module determines whether or how to generate a response to the challenge information. For example, when the first ID module generates the challenge information corresponding to the data set ($P_1$, $V_1$, $T_1$), the second ID module checks whether the challenge information from the first ID module is correct. As the first ID module is capable of generating correct challenge information, the second ID module finds that the challenge information from the first ID module is correct, and therefore generates a correct response to the challenge information. Thus, the result of the bidirectional authorization indicates that the first and the second portions pass the bidirectional authorization. As a result of Step 918, the navigation device should operate as usual.

If the first ID module is replaced with something else by the hacker, the second ID module may find that there is no such challenge information, or may find that received "challenge information" is abnormal or incorrect. In response to this situation, the second ID module may simply halt the whole navigation device in Step 918.

According to various implementation choices for this embodiment, the behavior of the navigation device determined in Step 918 can be varied when the result of the bidirectional authorization indicates that the first or the second portions fail to pass the bidirectional authorization. For example, when the first or the second portions fail to pass the bidirectional authorization, the first or the second ID modules may control the navigation device to interfere with the hacker's work by altering data, erasing data, and/or misusing a certain circuit within the navigation device to cause malfunction. In another example, when the first or the second portions fail to pass the bidirectional authorization, the first or the second ID modules may control the navigation device to wait for a predetermined period and then suddenly halt the whole navigation device, so that the hacker will not immediately detect that the hacking operation has gone wrong.

FIG. 3 is a block diagram of a plurality of modules of the navigation device in the embodiment shown in FIG. 2, where the navigation device (which is labeled "100" here) comprises an authorization system comprising ID modules 110, 120 and 130, and further comprises a navigation information module 140, a host processing module 150 and a Geographic Information System (GIS) module 160.

In practice, some of the modules shown in FIG. 3 can be implemented together, and therefore share all information available. For example, the ID module 110 can be implemented within the navigation information module 140, and is capable of deriving any information available within the navigation information module 140. In addition, the ID module 120 can be implemented within the host processing module 150, and is capable of deriving any information available within the host processing module 150. Additionally, the ID module 130 can also be implemented within the host processing module 150, and is capable of deriving any information available within the host processing module 150.

As shown in FIG. 3, data flows illustrated with DATA0, DATA1, DATA2 or DATA3 represent data utilized in navigation-related operations. For example, some of the data can be the data sets $(P_1, V_1, T_1)$ or $(P_2, V_2, T_2)$ mentioned above. In another example, some of the data can be measurement results for deriving the data sets $(P_1, V_1, T_1)$ or $(P_2, V_2, T_2)$. In addition, data flows illustrated with $G_1$, $G_2$ and $G_3$ represent challenge information to the ID modules 110, 120 and 130, respectively. Additionally, data flows illustrated with OK/NG represent response to the challenge information, where OK and NG stand for "authorized" and "non-authorized", respectively.

According to this embodiment, the bidirectional authorization can first be applied to the navigation information module 140 and the host processing module 150. In this situation, the navigation information module 140 and the host processing module 150 represent the first and the second portions, respectively. Accordingly, the ID modules 110 and 120 represent the first and the second ID modules, respectively. By applying the method 910 mentioned above, operations related to the bidirectional authorization are described as follows.

The ID module 110 sends the challenge information $G_2$ to the ID module 120, and a response to the challenge information $G_2$ is therefore sent back to the ID module 110 through the data flow DATA1. Then the ID module 110 sends a result OK to the navigation information module 140. In addition, the ID module 120 then sends the challenge information $G_1$ to the ID module 110, and a response to the challenge information $G_1$ is therefore sent back to the ID module 120 through one of the data flows DATA0. Then the ID module 120 sends a result OK to the host processing module 150. According to various implementation choices, the challenge information $G_1$ can be sent first and then the challenge information $G_2$ can be sent later.

Regarding the ID module 130, another aspect of the method 910 mentioned above is further described. The bidirectional authorization can be applied to the host processing module 150 and the GIS module 160. In this situation, the host processing module 150 and the GIS module 160 represent the first and the second portions, respectively. However, the ID module 130 plays the roles of both the first and the second ID modules. Similar descriptions to those detailed above are not repeated for this aspect.

According to another aspect of the method 910 mentioned above, the data flows between the host processing module 150 and the GIS module 160 can vary from the data flowing between the navigation information module 140 and the host processing module 150.

FIG. 4 is a block diagram of a plurality of modules of the navigation device in the embodiment shown in FIG. 2, where another aspect of the authorization method 910 mentioned above is applied to the lower half of the modules shown in FIG. 3, and other portions of the navigation device are not shown. Thus, the authorization system mentioned above comprises all the ID modules 170 and 180 shown in FIG. 4 according to this aspect. By applying the method 910 mentioned above, operations related to the bidirectional authorization are described as follows.

Similarly, some of the modules shown in FIG. 4 can be implemented together, and therefore share all information available. For example, the ID module 170 can be implemented within the host processing module 150, and is capable of deriving any information available within the host processing module 150. In addition, the ID module 180 can be implemented within the GIS module 160, and is capable of deriving any information available within the GIS module 160.

The ID module 170 sends the challenge information $G_8$ to the ID module 180, and a response to the challenge information $G_8$ is therefore sent back to the ID module 170 through the data flow DATA2. Then the ID module 170 sends a result OK to the host processing module 150. In addition, the ID module 180 then sends the challenge information $G_7$ to the ID module 170, and a response to the challenge information $G_7$ is therefore sent back to the ID module 180 through the data flow DATA4. Then the ID module 180 sends a result OK to the GIS module 160. According to various implementation choices, the challenge information $G_7$ can be sent first and then the challenge information $G_8$ can be sent later. Similar descriptions to those detailed above are not repeated for this aspect.

FIG. 5 illustrates that an illegal activity such as that shown in FIG. 1 is forbidden when bidirectional authorization is performed by applying the authorization method shown in FIG. 2 according to one embodiment of the present invention. The sub-blocks labeled "$ID_{11}$", "$ID_{12}$", "$ID_{21}$" or "$ID_{22}$" represent ID modules such as those mentioned above. In this embodiment, the ID modules $ID_{11}$ and $ID_{21}$ are implemented with ROM codes embedded in the low-end model Navigation IC (i.e. "aa DSP") and the high-end model Navigation IC (i.e. "bb DSP"), respectively. In addition, the ID modules $ID_{12}$ and $ID_{22}$ are implemented with software modules integrated into the RAM code named "aa DSP code" and the RAM code named "bb DSP code", respectively. Please note that the ID modules $ID_{11}$ and $ID_{22}$ shown in FIG. 5 do not match with each other. As a result of this, forbiddance due to the bidirectional authorization will occur.

Although FIG. 5 is illustrated with the host-based GPS IC architecture, this is only for illustrative purposes and is not meant to be a limitation of the present invention. According to another embodiment of the present invention, however, the method shown in FIG. 2 can also be applied to the System-on-Chip (SoC) architecture.

Those skilled in the art will readily observe that numerous modifications and alterations of the device and method may be made while retaining the teachings of the invention.

What is claimed is:

1. An authorization system of a navigation device comprising:
    a first identification (ID) module arranged to perform authorization for a first portion of the navigation device; and
    a second ID module arranged to perform authorization for a second portion of the navigation device, wherein the first ID module generates challenge information to challenge the second ID module in order to determine whether the second portion is authorized, the challenge information is generated by the first ID module according to a position, a velocity and/or a time of the navigation device;

wherein the first and the second ID modules perform bidirectional authorization of the first and the second portions, and further determine behavior of the navigation device according to a result of the bidirectional authorization.

2. The authorization system of claim 1, wherein the first portion is a navigation information module, and the second portion is a host processing module.

3. The authorization system of claim 1, wherein the first portion is a host processing module, and the second portion is a GIS module.

4. An authorization method for controlling a navigation device, the method comprising:
 performing a first authorization for a first portion of the navigation device;
 performing a second authorization for a second portion of the navigation device;
 performing a bidirectional authorization of the first and the second portions by generating a challenge information to determine whether the second portion is authorized, wherein the challenge information is generated according to a position, a velocity and/or a time of the navigation device; and
 determining behavior of the navigation device according to a result of the bidirectional authorization.

5. The method of claim 4, wherein the first portion is a host processing module, and the second portion is a GIS module.

6. The method of claim 4, wherein the first portion is a navigation information module, and the second portion is a host processing module.

7. An authorization system of a navigation device comprising:
 a first identification (ID) module arranged to perform authorization for a first portion of the navigation device; and
 a second ID module arranged to perform authorization for a second portion of the navigation device, wherein the second ID module generates challenge information to challenge the first ID module in order to determine whether the first portion is authorized, and the second ID module generates the challenge information according to a position, a velocity and/or a time of the navigation device;
 wherein the first and the second ID modules perform bidirectional authorization of the first and the second portions, and further determine behavior of the navigation device according to a result of the bidirectional authorization.

8. The authorization system of claim 7, wherein the second ID module checks whether the challenge information generated by the first ID module is correct in order to determine whether the first portion is authorized.

9. The authorization system of claim 8, wherein according to whether the challenge information generated by the first ID module is correct, the second ID module determines whether or how to generate a response to the challenge information.

10. The authorization system of claim 9, wherein the first ID module checks whether the second ID module generates a correct response to the challenge information in order to determine whether the second portion is authorized.

11. An authorization method for controlling a navigation device, the method comprising:
 performing a first authorization for a first portion of the navigation device;
 performing a second authorization for a second portion of the navigation device;
 performing a bidirectional authorization of the first and the second portions by generating challenge information to determine whether the first portion is authorized, wherein the challenge information is generated according to a position, a velocity and/or a time of the navigation device; and
 determining behavior of the navigation device according to a result of the bidirectional authorization.

12. The method of claim 11, wherein the step of performing bidirectional authorization of the first and the second portions further comprises:
 checking whether the challenge information is correct in order to determine whether the first portion is authorized.

13. The method of claim 12, wherein the step of performing bidirectional authorization of the first and the second portions further comprises:
 according to whether the challenge information is correct, determining whether or how to generate a response to the challenge information.

14. The method of claim 13, wherein the step of performing bidirectional authorization of the first and the second portions further comprises:
 checking whether a correct response is generated to the challenge information in order to determine whether the second portion is authorized.

* * * * *